United States Patent
Balzli, Jr.

(10) Patent No.: US 8,522,185 B1
(45) Date of Patent: Aug. 27, 2013

(54) METHOD FOR PLACEMENT AND ROUTING OF A CIRCUIT DESIGN

(75) Inventor: Robert M. Balzli, Jr., Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/366,839

(22) Filed: Feb. 6, 2012

(51) Int. Cl.
*G06F 17/50* (2006.01)
(52) U.S. Cl.
USPC ........... 716/126; 716/119; 716/129; 716/130; 716/131
(58) Field of Classification Search
USPC ................. 716/118, 119, 126, 129, 130, 131
See application file for complete search history.

(56) References Cited

U.S. PATENT DOCUMENTS

| | | | |
|---|---|---|---|
| 5,349,248 A * | 9/1994 | Parlour et al. | 326/38 |
| 5,521,837 A * | 5/1996 | Frankle et al. | 716/113 |
| 5,963,050 A * | 10/1999 | Young et al. | 326/41 |
| 6,216,257 B1 * | 4/2001 | Agrawal et al. | 326/41 |
| 7,206,967 B1 * | 4/2007 | Marti et al. | 714/25 |
| 7,301,822 B1 | 11/2007 | Walstrum, Jr. et al. | |
| 7,932,743 B1 | 4/2011 | Stewart et al. | |
| 8,196,081 B1 * | 6/2012 | Arslan et al. | 716/126 |
| 8,196,083 B1 * | 6/2012 | Kong | 716/126 |

OTHER PUBLICATIONS

Tam, Simon et al., *Fast Configuration of PCI Express Technology through Partial Reconfiguration*, XAPP883 (v1.0), Nov. 19, 2010, pp. 1-45, Xilinx, Inc., San Jose, California, USA.
Xilinx, Inc., *Xilinx 5.1i Increment al Design Flow*, XAPP418 (v1.2), Aug. 25, 2003, pp. 1-20, Xilinx, Inc., San Jose, California, USA.

* cited by examiner

*Primary Examiner* — Sun Lin
(74) *Attorney, Agent, or Firm* — LeRoy D. Maunu; Lois D. Cartier (57) ABSTRACT

Approaches for placement and routing of a circuit design are disclosed. Two or more modules of a circuit design are assigned to respective regions of a programmable integrated circuit. Placement and routing constraints are created for non-global resources of two or more modules of the circuit design. The placement and routing constraints restrict placement and routing of non-global resources of each of the two or more modules to respective regions of a programmable IC. Each non-global resource is used by at most one of the two or more modules. The two or more modules are placed. In response to the one of the placed circuit elements not being placed within the assigned region, the routing constraint on the one of the circuit elements is removed. The circuit design is routed.

20 Claims, 8 Drawing Sheets

METHOD FOR PLACEMENT AND ROUTING OF A CIRCUIT DESIGN

FIELD OF THE INVENTION

The embodiments generally relate to the placement and routing of circuit designs.

BACKGROUND

Programmable integrated circuits (ICs) are often used to implement digital logic operations according to user configurable input. Example programmable ICs include complex programmable logic devices (CPLDs) and field programmable gate arrays (FPGAs). CPLDs often include several function blocks that are based on a programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading configuration data ("configuration bitstream") into internal configuration memory cells. The state of the configuration memory cells determines the function of the CLBs, IOBs, and interconnect structure. The configuration bitstream may be read from an external memory, such as an EEPROM, EPROM, PROM, and the like, though other types of memory may be used.

A conventional design process begins with the creation of the design. The design specifies the function of a circuit at a schematic or logic level and may be represented using various hardware description languages (e.g., VHDL, ABEL, or Verilog) or schematic capture programs. The design is synthesized to produce a logical network list ("netlist"), and the synthesized design is mapped onto primitive components within the target device (e.g., programmable logic blocks of an FPGA).

Following mapping, placement of the components of the synthesized and mapped design is performed for the target device. During placement, each mapped component of the design is assigned to a physical position on the device. The placer attempts to place connected design objects in close physical proximity to one another in order to conserve space and increase the probability that the required interconnections between components will be successfully completed by the router. Placing connected components close to one another also generally improves the performance of the circuit since long interconnect paths are associated with excess capacitance and resistance, resulting in longer delays and greater power consumption.

Specified connections between components of the design are routed within the target device for the placed components. The routing process specifies physical wiring resources that will be used to conduct signals between pins of placed components of the design. For each connection specified in the design, the routing process allocates wire resources necessary to complete the connection. As used herein, the selection and assignment of wire resources in connecting the output pin of one component to the input pin of another component is referred to as routing a net. When nets have been routed using most or all of the wiring resources in a given area, the area is generally referred to as congested, which creates competition for the remaining wiring resources in the area or makes routing of additional nets in the area impossible.

To expedite development, a number of sub-circuits of a system may be developed in parallel by respective teams of developers. However, without proper coordination, placement and routing of all of the sub-circuits on the target programmable IC may not be possible. For example, the target programmable IC may not have sufficient resources to place all of the sub-circuits together on the programmable IC. Similarly, assuming placement can be achieved, there may be insufficient routing resources to interconnect the placed components as required.

In order to ensure that sufficient resources will be available to implement the sub-circuits of a design, each development team may be assigned a respective region of programmable fabric of a programmable IC. By restricting circuit development of each team to a different region, placement conflicts between the teams may be avoided. Further, because the assigned regions are mutually exclusive, placement and routing may be performed for each region individually during development. This allows a development team to test and optimize the sub-circuit under development with the expectation that the placement and routing within the assigned region will be maintained in the complete design.

However, for programmable ICs such as FPGAs, all hardware resources needed to implement a sub-circuit may not be available in the assigned region. For example, some resources of a programmable IC such as global clock sources (e.g., BUFGs, MMCMs, PLLs), reset, PCI, Serdes circuits, JTAG, BSCAN, DNA_PORT, DCI, EFUSE, etc., are utilized by many or all sub-circuits but may be outside the assigned region. For ease of reference, resources shared by multiple regions may be referred to as global resources. To enable parallel development of sub-circuits the global resources must be located outside of the assigned regions. Routing between the assigned regions and global resources poses a significant challenge for many development flows.

Figure 1:
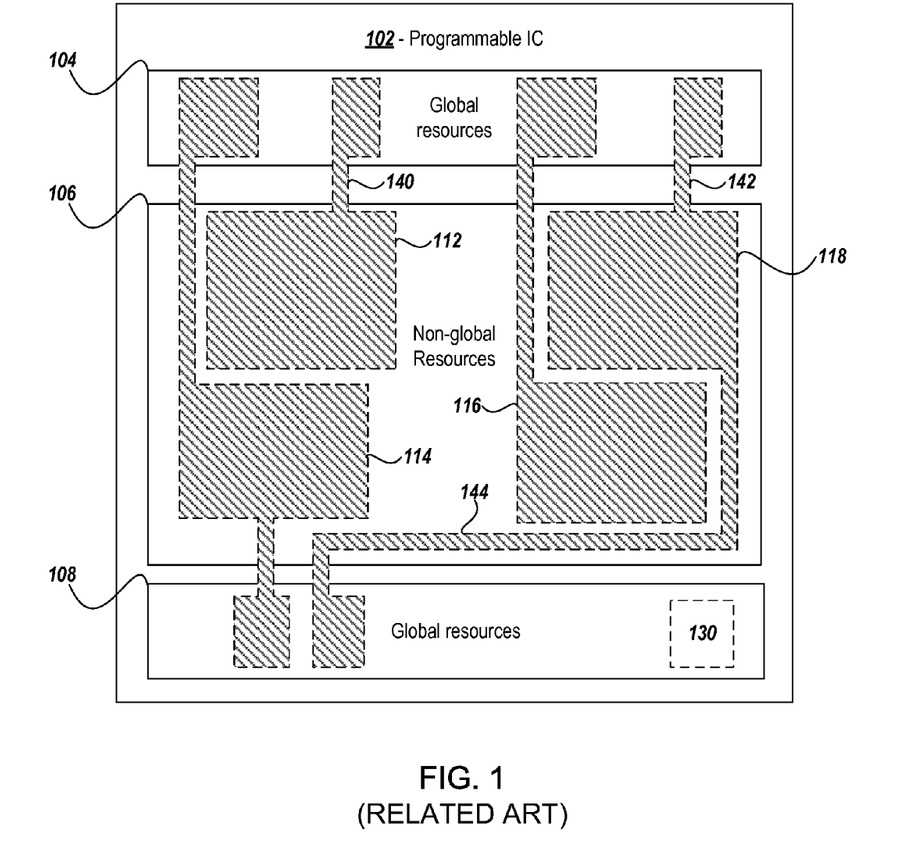
FIG. 1 illustrates use of placement constraints to reserve routing channels between assigned regions and global resources.

In one approach, respective routing resources are explicitly assigned to a team to route signals between each assigned region and required global resources. FIG. 1 shows a programmable IC design layout with assigned routing channels reserved to provide routing between assigned placement regions and global resources. In this example, four regions (112, 114, 116, and 118) are defined in programmable resources 106 of the programmable IC 102. Each sub-circuit to be implemented in the regions requires use of global resources 104 and 108. In order to ensure that routing can be performed when independently developed sub-circuits of the four regions are combined into the completed circuit, routing resources are reserved to form routing channels. For example, region 112 has one routing channel 140 reserved to route signals between region 112 and global resources 104. As another example, region 118 has one routing channel 142 reserved to route signals between region 118 and global resources 104 and a second routing channel 144 reserved to route signals between region 118 and global resources 108. The routing channels are mutually exclusive to allow each team to perform routing of signals with routing resources in the channels. As a result, the routing channels cannot cross. This may significantly restrict versatility of circuit designs. For example, signals from region 116 may not be routable to pin 130 of global resources 108 because routing paths are blocked by routing channels 144 of region 118.

One or more embodiments may address one or more of the above issues.

SUMMARY

In one embodiment, a processor-implemented method is provided for placement and routing of a circuit design. Two or more modules of a circuit design are assigned to respective regions of a programmable integrated circuit. Placement and routing constraints are created for non-global resources of two or more modules of the circuit design. The placement and routing constraints restrict placement and routing of non-global resources of each of the two or more modules to respective regions of a programmable IC. Each non-global resource is used by at most one of the two or more modules. The two or modules are placed. In response to the one of the placed circuit elements not being placed within the assigned region, the routing constraint on the one of the circuit elements is removed by a processor. The circuit design is then routed.

In another embodiment, a processor-implemented method for configuring boot order of a circuit design on a programmable IC is provided. One or more nets of a circuit design are assigned to respective fast-boot regions of a programmable IC. A boot sequence order is assigned that specifies an order for booting the fast-boot regions on the programmable IC. Placement and routing of the circuit design are performed. Loads that are located within the respective fast-boot regions are determined. For each of the loads located within a respective fast-boot region, resources of the programmable IC that are used by one of the nets that drives the load and that are located outside the respective fast-boot region are determined to be extra-region resources. For each fast-boot region, a respective set of configuration frames is determined by a processor. Each respective set includes configuration frames containing configuration data for the fast boot region, along with configuration frames containing configuration data for the corresponding extra-region resources of the fast-boot region. One or more bitstreams are generated in which the sets of configuration frames of the fast-boot regions are in an order corresponding to the assigned boot sequence order of the fast-boot regions.

In yet another embodiment, an article of manufacture is provided. The article includes a non-transitory computer-readable medium having instructions that when executed by a processor causes the processor to perform operations. In response to a first user command, the instructions cause the processor to assign two or more modules of a circuit design to respective regions of a programmable integrated circuit. The processor creates placement and routing constraints for non-global resources of two or more modules of the circuit design. The constraints restrict placement and routing of non-global resources of each of the two or more modules to respective regions of a programmable integrated circuit. The non-global resources are used by at most one of the two or more modules. The processor places circuit elements of the two or more modules. In response to one of the placed circuit elements not being placed within the assigned region, the instructions cause the processor to remove the routing constraint on the one of the placed circuit elements. The instructions then cause the processor to route the circuit design.

It will be appreciated that various other embodiments are set forth in the Detailed Description and Claims, which follow.

BRIEF DESCRIPTION OF THE DRAWINGS

Various aspects and advantages of the embodiments of the invention will become apparent upon review of the following detailed description and upon reference to the drawings, in which:

FIGS. 3-1 through 3-3 illustrate placement and routing in accordance with one or more embodiments;

DETAILED DESCRIPTION

One or more embodiments provide placement and routing methods that enable parallel development of sub-circuits in different regions of a programmable IC. In one embodiment, two or more modules of a circuit design are assigned to respective regions of a programmable IC. Constraints are created that limit placement and routing of each module to the assigned regions. However, placement of objects of the design calling for global resources is unconstrained, which allows these objects to be properly placed by the placer. Following placement, routing restrictions are removed for elements placed outside of the assigned regions. During development, each region may be separately placed and routed as required, using the placement and routing constraints. This allows development teams to test and/or simulate behavior within each region. After placing and routing in each region, the signals between the regions and global resources are rerouted to integrate the modules into a complete design.

Figure 2:
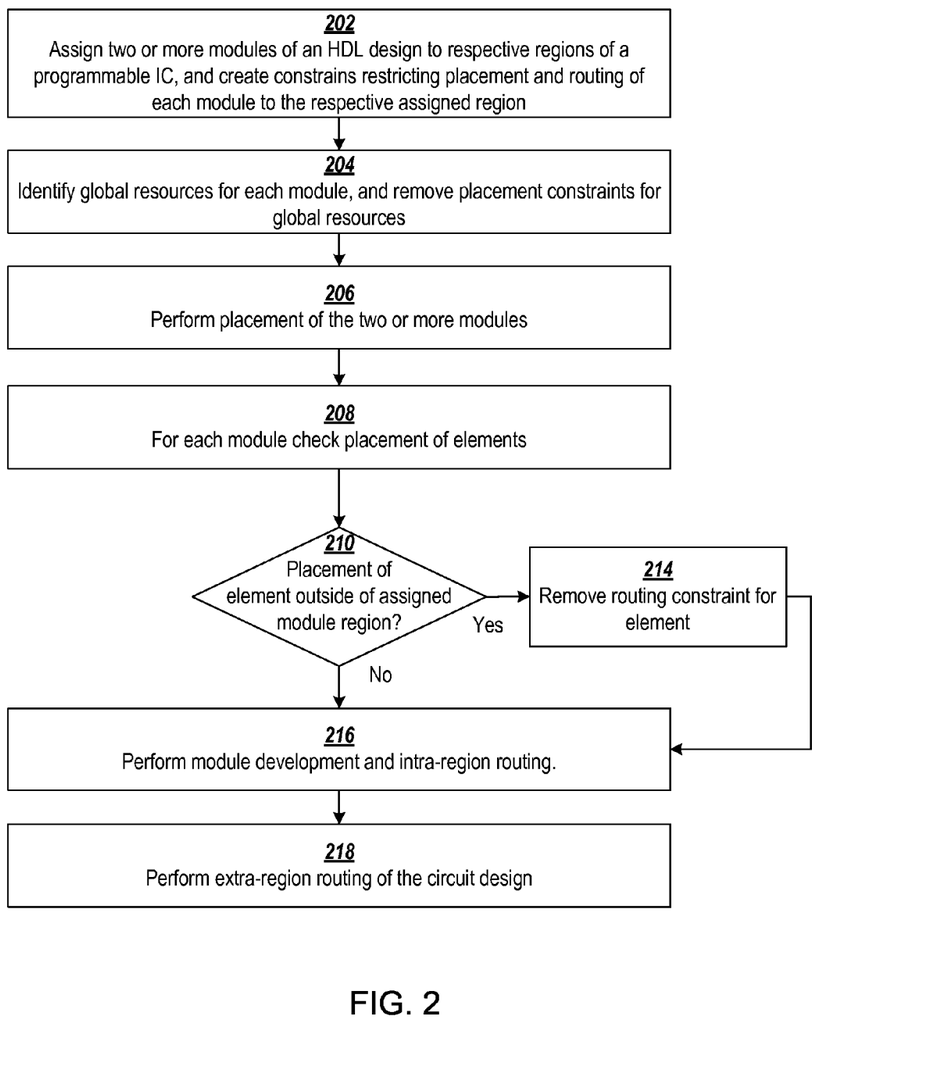
FIG. 2 shows a process for placement and routing of a design in assigned regions and with global resources in accordance with one or more embodiments.

FIG. 2 shows a process for placement and routing in accordance with one or more embodiments. One or more modules are assigned to respective areas of a programmable IC, and constraints are created to restrict placement and routing of each of the one or more modules to the assigned area of the programmable IC at block 202. At block 204, for each of the one or more modules, global resources required by the modules are identified, and placement constraints of the identified global resources are removed.

Placement of the entire circuit design is performed at block 206. In performing the placement, the regions to which modules are assigned guides the placement via the placement constraints. However, the initial placement process may deviate from the assigned regions in order to arrive at a solution. Thus at block 208, upon completion of the initial placement, the process checks elements of each module to determine whether or not the actual placement of elements of the modules is consistent with the assigned regions. If an element is placed outside the region assigned to the module (decision block 210), routing constraints are removed for the element at block 214. This causes routing constraints to be removed for global resources. The remaining routing constraints are useful for independent development within each region, which can then be performed at the team level.

Development of circuits of the different regions is performed at block 216. This development may be performed for the different regions in parallel at the team level. Such development may include testing, adjustment to the circuit design module, adjustment of intra-region placement, or intra-region routing. For example, to improve signal timing of a sub-circuit, placement and routing may be adjusted within the corresponding region during development.

When development of the modules within the regions is completed, the implemented modules of the regions may be combined. The combination of modules retains placement of elements and routing within each region (if available). However, if routing had been performed using routing resources located outside the regions (extra-region routing) during development of block 216, such extra-region routing must be rerouted because there may be congestion between the extra-region routing of different regions. For example, in development of circuits in first and second regions, developers of each region may have independently routed signals between the respective regions and global resources for testing/simulation. Because such extra-region routing of the two regions were performed independently, without coordination between the regions, extra-region routing of each region may have allocated the same routing resources. Therefore, routing congestion would be present and extra-region routing would have to be rerouted. Accordingly, extra-region routing is performed at block 218 to complete the circuit design.

It was previously thought that if routing channels were not reserved as explained with reference to FIG. 1, it would be difficult to meet timing and routing requirements of extra-region signal routing, due to congestion. Surprisingly, testing indicates that extra-region routing may be performed after development and routing of individual regions with little congestion. This approach removes the burden of creating design constraints from the user thereby simplifying the flow and time to solution. The run time of placement and routing algorithms are reduced due to the fact that these algorithms no longer have to deal with constraints that slow down the algorithm and lead to suboptimal quality of results. In addition, timing optimization may be improved in comparison to the previous approaches because the extra region routing is not constricted to specified channels.

It is recognized that extra-region routing (if generated during circuit development of a region) may not need to be completely rerouted at block 218. In one or more embodiments, extra-region routing may be performed using an incremental routing algorithm. Incremental routing uses existing routing as a starting point in the routing process. Conflicting routes of the existing routing are identified and rerouted to avoid congestion. It is understood that routing may be performed at block 218 using a number of different routing techniques known in the art.

Figure 31:
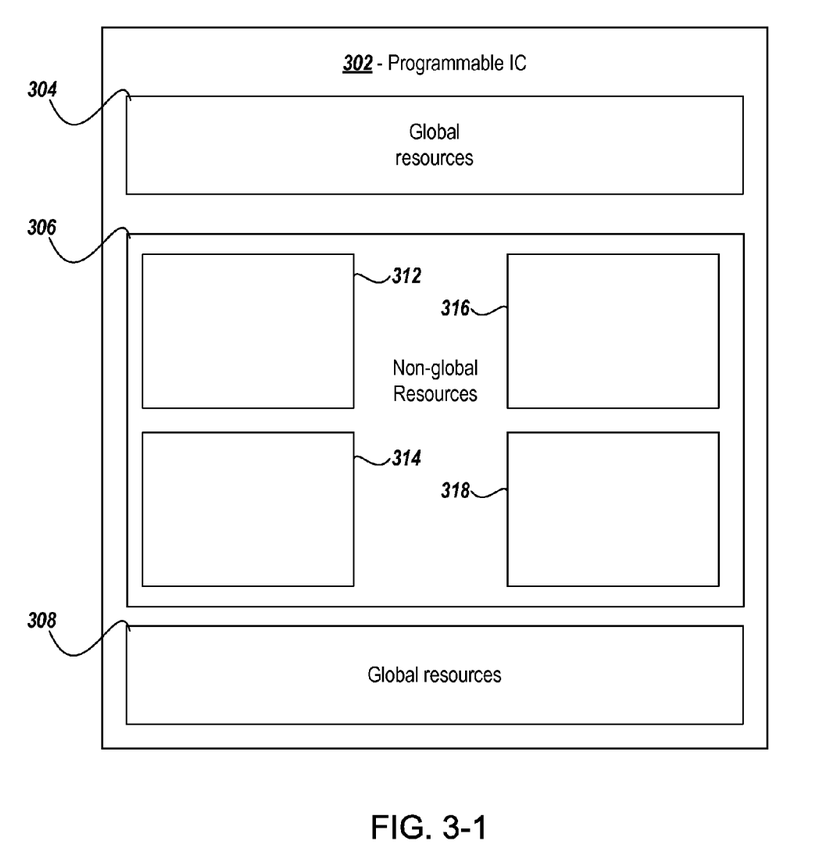
Figure 32:
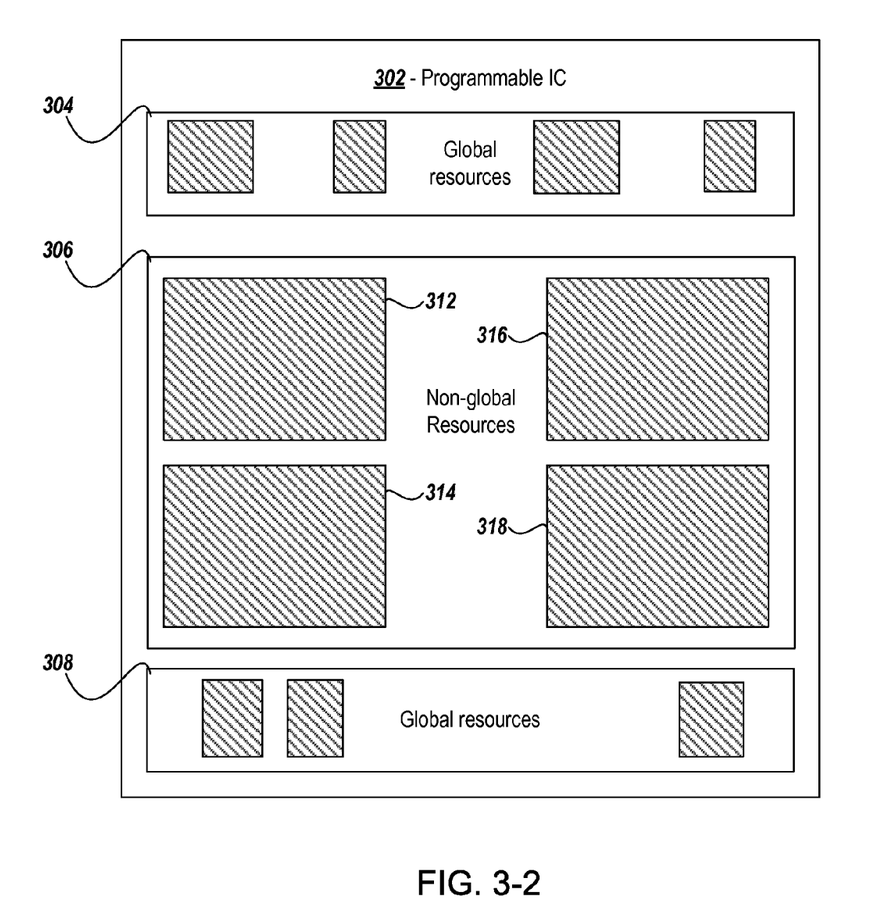
Figure 33:
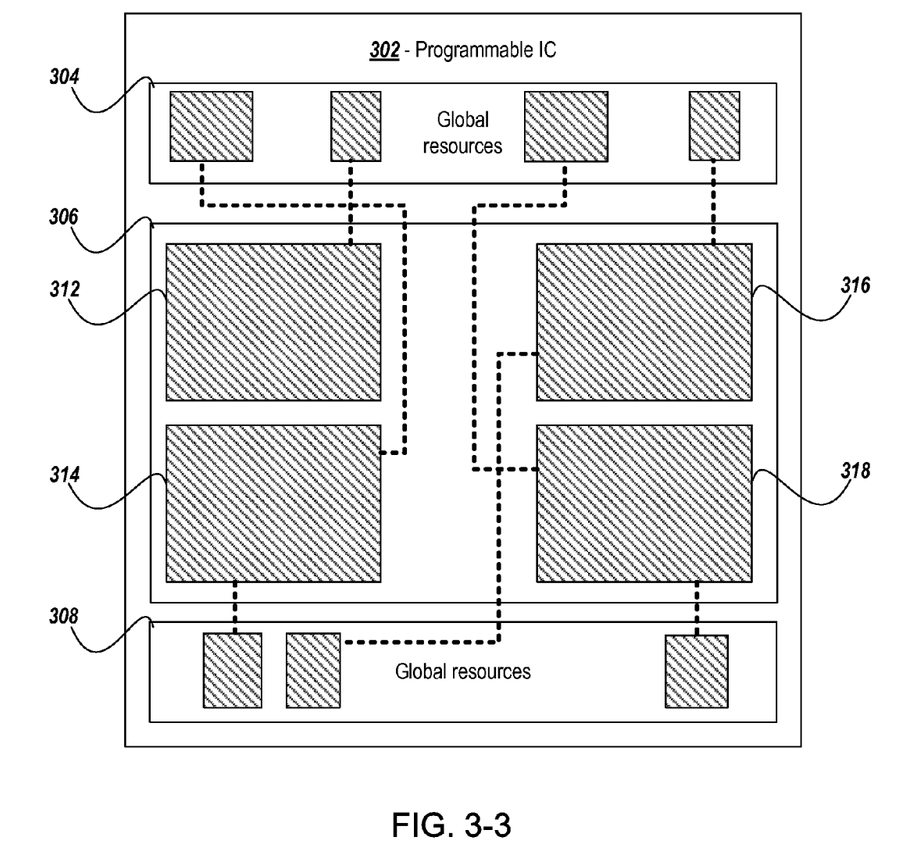

FIGS. 3-1 through 3-3 illustrate placement and routing in accordance with one or more embodiments. FIGS. 3-1 illustrates assignment of four regions (312, 314, 316, and 318) in non-global programmable resources 306 of programmable IC 302 using placement constraints. Global resources 304 and 308 remain unallocated. No routing channels are created to route signals between the four regions and the global resources. FIGS. 3-2 illustrates placement and intra-region routing of modules of a circuit design according to the placement constraints of the assigned regions. Regions 312, 314, 316, and 318 are shown with diagonal hash lines to represent elements of modules having been placed and intra-region routing having been performed. Hashed blocks in the global resources 304 and 308 represent pins of the global resources having been assigned to the modules. FIGS. 3-3 illustrates extra region routing of the circuit design. Extra-region routing of signals is illustrated as dashed lines. As shown in FIGS. 3-3, some of the routed signals cross paths. This is possible because the routed signals likely will not require use of all routing resources along a path. Because routed signals may cross paths, more efficient routing may be realized in comparison to previous approaches in which routing channels are reserved.

One or more embodiments may be applicable to a variety of programmable IC applications where regions of programmable resources are defined for controlling booting of the IC. For example, in some applications, regions may be defined to direct the order in which sub-circuits of a system are booted at startup. In this manner, startup times of programmable ICs may be decreased.

In some previous approaches, partial reconfiguration has been used to prioritize booting of one or more sub-circuits at startup. However, the prior approaches did not identify which global resources were necessary for partial reconfiguration of a sub-circuit. As a result, all configuration frames for all global resources were booted prior to booting other portions of the system. For example in order to prioritize booting of PCIe circuitry, all global resources would be booted at startup even though PCIe only utilizes a small portion of these resources. Booting of all global resources increases startup time of the system beyond that which may be required.

Use of partial reconfiguration to cause a sub-circuit to boot after booting the area with PCIe requires that nets of the sub-circuit be modified to include proxy logic. Such proxy logic adds additional delay to the nets, which may unnecessarily slow the circuit. Additional details regarding partial reconfiguration and proxy logic may be found in co-pending patent application X-3682, which is fully incorporated by reference herein.

One or more embodiments provide a method to prioritize booting of sub-circuits of one or more regions at startup without performing partial configuration. For circuits in a specified region of a programmable IC, one or more embodiments determine resources located outside of the region (extra-region resources) that are required for operation of circuitry in the region. Configuration may then be prioritized to load configuration frames for the region and required extra-region prior to other configuration frames. In this manner, only required global resources need be loaded and startup time may be reduced.

Figure 4:
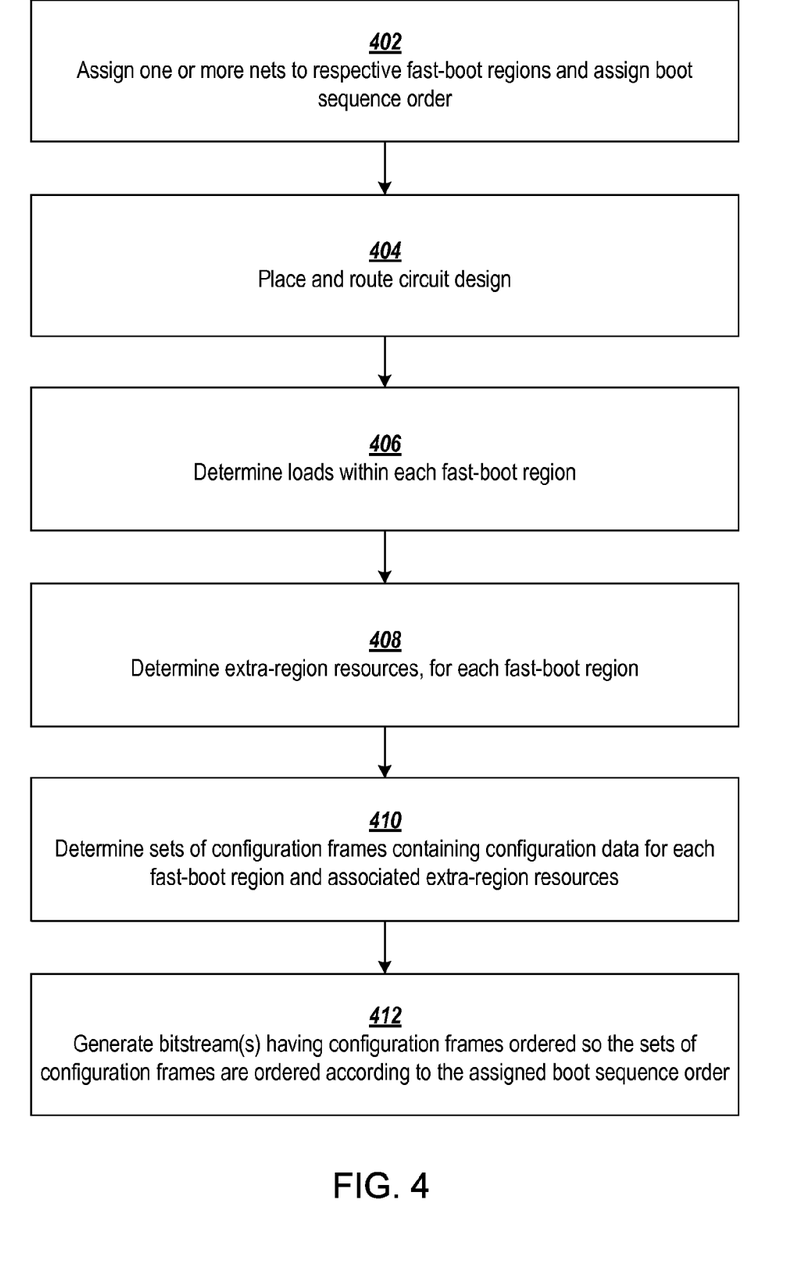
FIG. 4 shows a process for fast-boot of different regions of a circuit design in accordance with one or more embodiments.

FIG. 4 shows a process for prioritized booting of different regions of a circuit design in accordance with one or more embodiments. For ease of reference, circuitry in regions to be booted with priority at startup may be referred to as fast-boot regions. One or more nets of a circuit design are assigned to respective fast-boot regions and assigned a boot sequence order at block 402. The circuit design is placed and routed at block 404. In one or more embodiments, placement and routing may be performed using the methods described with reference to FIGS. 2 and 3. Loads to be driven within each fast boot region are determined at block 406.

Extra-region resources required to drive the load of each fast boot region are determined at block 408. In one or more embodiments, extra-region resources used to drive loads in a fast-boot region may be automatically determined by tracing signals from the loads located in the corresponding fast-boot region to drivers of the signals. In response to a global resource being a driver of one of the signals, the global resource is selected as an extra-region resource of the fast-boot region.

In some embodiments, additional extra-region resources may be specified by a user. In response to a user command, data may be stored that associates an extra-region resource with a fast-boot region. For example, a user may select extra-region resources such as a load pin located outside the fast-boot region as an extra-region resource. In response to a user command, data may be stored as a parameter of the pin, and the data associates the pin with the fast-boot region. When extra-region resources are determined at block 408, parameters of resources may be retrieved to determine extra-region resources that have been specified by the user.

For each fast boot region, a set of configuration frames is determined at block 410. Each set contains all configuration frames having configuration data for the fast-boot region and associated extra-region resources. One or more bitstreams are generated at block 412. The bitstreams have the sets of configuration frames ordered according to the assigned boot sequence order of the corresponding fast-boot regions.

The boot sequence priority may include any number of prioritized boot stages in the sequence. It is understood that configuration frames identified as being required for different regions may overlap.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

Figure 5:
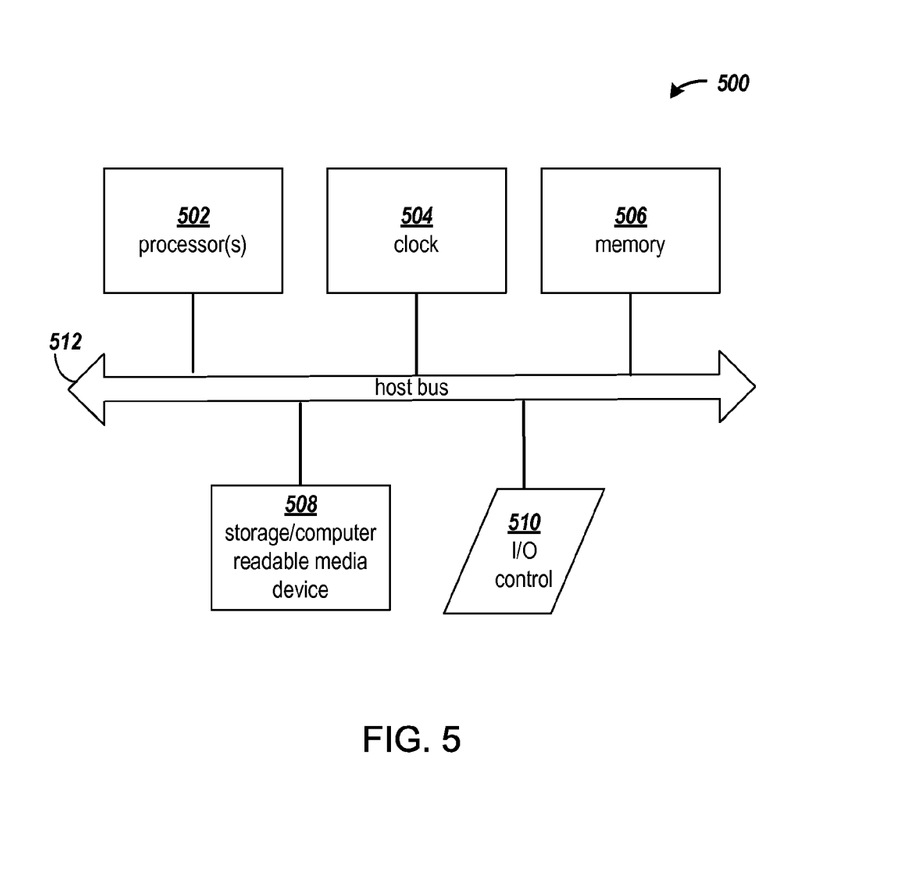
FIG. 5 shows a computing system that may be used to implement the processes disclosed herein.

FIG. 5 illustrates a block diagram of a computing arrangement that may be configured to implement the placement and routing processes described herein. Those skilled in the art will appreciate that various alternative computing arrangements, including a plurality of processors and a memory arrangement configured with program code, would be suitable for hosting the processes and data structures and implementing the algorithms of the different embodiments of the present invention. The program code, encoded in a processor executable format, may be stored and provided via a variety of computer-readable storage media or delivery channels such as magnetic or optical disks or tapes, electronic storage devices, or as application services over a network.

Processor computing arrangement 500 includes two or more processors 502, a clock signal generator 504, a memory unit 506, a storage unit 508, and an input/output control unit 510 coupled to host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 502 may be one or more general-purpose processors, or a combination of one or more general-purpose processors and suitable co-processors, a multi-core processor, or one or more specialized processors (e.g., RISC, CISC, pipelined, etc.).

The memory arrangement 506 typically includes multiple levels of cache memory and a main memory. The storage arrangement 508 may include local and/or remote persistent storage such as provided by magnetic disks (not shown), flash, EPROM, or other non-volatile data storage. The storage unit may be read or read/write capable. Further, the memory 506 and storage 508 may be combined in a single arrangement.

The processor arrangement 502 executes the software in storage 508 and/or memory 506 arrangements, reads data from and stores data to the storage 508 and/or memory 506 arrangements, and communicates with external devices through the input/output control arrangement 510. These functions are synchronized by the clock signal generator 504. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different embodiments of the present invention.

Figure 6:
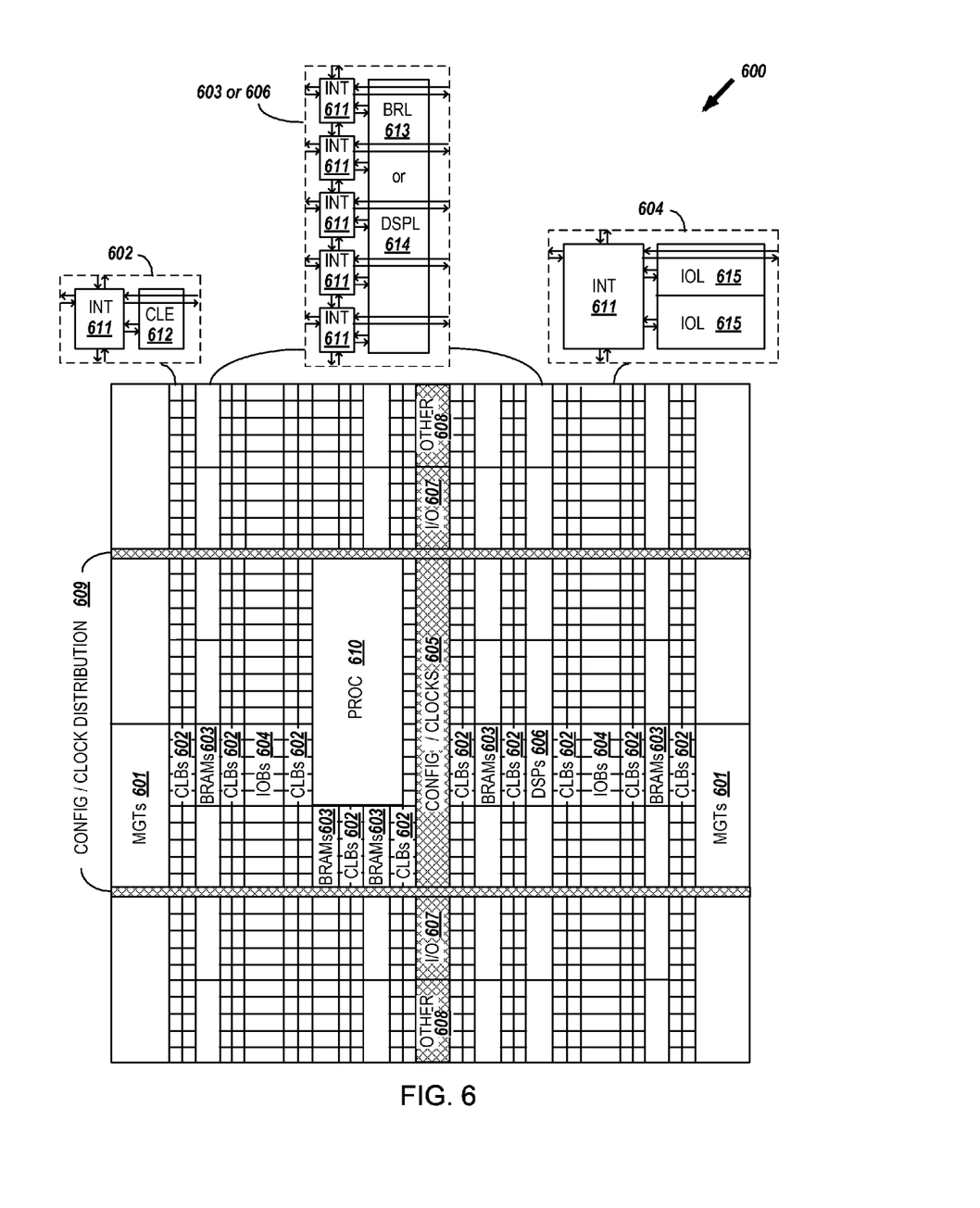
FIG. 6 shows a programmable IC that may be configured in accordance with one or more embodiments.

FIG. 6 is a block diagram of an example field programmable gate array (FPGA) which may be used as a target device for place-and-route in accordance with one or more embodiments of the invention. FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, clock ports, and other programmable logic 608 such as digital clock managers, analog-to-digital converters, system monitoring logic, and so forth. Some FPGAs also include dedicated processor blocks (PROC 610). While not shown, it will be appreciated that FPGA 600 also includes external and internal reconfiguration ports.

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic plus a single programmable interconnect element INT 611. A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used.

A DSP tile 606 can include a DSP logic element (DSPL 614) in addition to an appropriate number of programmable interconnect elements. With the FPGA as the target device, an inference pattern would be provided for the DSP logic element(s) available on the device. If portions of the design are found to be optimal, after timing analysis, those portions would be implemented by the DSP elements.

An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

The embodiments of the present invention are thought to be applicable to a variety of systems utilizing programmable logic. For example, some programmable ICs, such as FPGAs, may implement a system monitor to measure and react to physical operating parameters such as on-chip power supply voltages, die temperatures, single event upset detection, etc. In some applications, the system monitor may be started shortly after the FPGA is powered-up and before performing configuration of other logic. This allows the system monitor to ensure that the remaining logic doesn't violate device requirements such as temperature, fan failures and other device requirements. The system monitor can also be used to monitor security during configuration. For example, some applications require a security monitor that can be booted before other logic is configured so that anti-tampering mechanisms are in place prior to any other logic being programmed into the device. The prioritized booting discussed with reference to FIG. 4, may be used to boot system and security monitors prior to booting other logic of a circuit design.

Other aspects and embodiments will be apparent to those skilled in the art from consideration of the specification. It is intended that the specification and illustrated embodiments be considered as examples only, with a true scope and spirit of the disclosure being indicated by the following claims.

What is claimed is:

1. A processor-implemented method for placement and routing of a circuit design, comprising:
    assigning two or more modules of a circuit design to respective regions of a programmable integrated circuit;
    creating placement and routing constraints for non-global resources of the two or more modules of the circuit design that restrict placement and routing of the non-global resources of each of the two or more modules to the respective regions of the programmable integrated circuit, the non-global resources being used by at most one of the two or more modules;
    placing circuit elements of the two or more modules;
    in response to one of the placed circuit elements not being placed within the assigned respective region, removing, by a processor, the routing constraint on the one of the placed circuit elements; and
    routing the circuit design.

2. The method of claim 1, wherein the routing the circuit design includes:
    performing intra-region routing of each of the two or more modules; and
    after performing the intra-region routing, performing extra-region routing of the circuit design.

3. The method of claim 2, wherein the extra-region routing of the circuit design includes routing the circuit design using the intra-region routing of the circuit design.

4. The method of claim 2, wherein the performing extra-region routing includes performing incremental routing of signals between the assigned regions and global resources, the global resources being resources that are shared by at least two of the two or more modules.

5. The method of claim 1, wherein the placing circuit elements of the two or more modules includes retrieving a list of global resources from a database.

6. The method of claim 1, wherein the respective regions do not define routing channels between global resources and the non-global resources.

7. A processor-implemented method for configuring a boot order of a circuit design on a programmable integrated circuit (IC), the method comprising:
    assigning one or more nets of a circuit design to respective fast-boot regions of a programmable IC;
    assigning a boot sequence order that specifies an order for booting the fast-boot regions on the programmable IC;
    performing placement and routing of the circuit design;
    determining loads that are located within the respective fast-boot regions;
    for each load of the determined loads located within each of the respective fast-boot regions, determining resources of the programmable IC that are used by one of the nets that drives the each load and that are located outside the respective fast-boot region, to be extra-region resources;
    for each fast-boot region, determining a respective set of configuration frames by a processor, the set including:
        configuration frames containing configuration data for the fast-boot region; and
        configuration frames containing configuration data for the extra-region resources associated with the fast-boot region; and
    generating one or more bitstreams having the sets of configuration frames of the fast-boot regions in an order corresponding to the assigned boot sequence order of the fast-boot regions.

8. The method of claim 7, wherein the determining extra-region resources used by one of the nets includes:
    tracing signals from the determined loads located in a corresponding fast-boot region to drivers of the signals; and
    in response to a global resource being a driver of one of the signals, selecting the global resource as an extra-region resource used by the one of the nets.

9. The method of claim 7, further comprising:
    in response to a user command specifying one of the fast-boot regions and a resource located outside of the fast-boot regions, storing data that associates the resource with the specified fast-boot region; and
    wherein the determining extra-region resources includes retrieving the data that associates the resource with the specified fast-boot region.

10. The method of claim 9, wherein the resource is a load pin located outside the specified fast-boot region, and the stored data is a parameter of the load pin.

11. The method of claim 7, wherein the performing placement and routing of the circuit design includes:
    performing an initial placement of the one or more nets;
    in response to the initial placement having one of the resources of one or more nets placed outside a corresponding fast-boot region, removing routing constraints on the one of the resources; and
    routing the one or more nets.

12. The method of claim 7, wherein:
    the one or more nets of a circuit design assigned to respective fast-boot regions of a programmable IC include a system monitoring circuit; and the boot sequence order indicates that fast boot regions corresponding to the system monitoring circuit are to be booted prior to all other fast boot regions.

13. The method of claim 12, wherein the system monitoring circuit is configured and arranged to monitor one or more of a set of physical operating parameters of the programmable IC, the set of physically operating parameters including supply voltage and temperature.

14. The method of claim 12, wherein the system monitoring circuit is configured and arranged to implement one or more security features during configuration of the other fast boot regions.

15. An article of manufacture, comprising
   a non-transitory computer-readable medium having instructions that when executed by a processor cause the processor to perform operations including:
   in response to a first user command, assigning two or more modules of a circuit design to respective regions of a programmable integrated circuit;
   creating placement and routing constraints for non-global resources of the two or more modules of the circuit design that restrict placement and routing of the non-global resources of each of the two or more modules to the respective regions of the programmable integrated circuit, the non-global resources being used by at most one of the two or more modules;
   placing circuit elements of the two or more modules;
   in response to one of the placed circuit elements not being placed within the assigned regions, removing the routing constraint on the one of the placed circuit elements; and
   routing the circuit design.

16. The article of manufacture of claim 15, wherein the instructions cause the processor to perform the routing of the circuit design by performing operations including:
   performing intra-region routing of each of the two or more modules; and
   after performing the intra-region routing, performing extra-region routing of the circuit design.

17. The article of manufacture of claim 16, wherein the instructions cause the processor to perform the extra-region routing of the circuit design by performing operations including routing the circuit design using the intra-region routing of the circuit design.

18. The article of manufacture of claim 16, wherein the instructions cause the processor to perform the extra-region routing of the circuit design by performing operations including performing incremental routing of signals between the assigned regions and global resources, the global resources being resources that are shared by at least two of the two or more modules.

19. The article of manufacture of claim 15, wherein the instructions cause the processor to perform the placing circuit elements of the two or more modules by performing operations including retrieving a list of global resources from a database.

20. The article of manufacture of claim 15, wherein the respective regions do not define routing channels between global resources and the non-global resources.

* * * * *